(12) United States Patent
Kreuder et al.

(10) Patent No.: US 8,572,037 B2
(45) Date of Patent: Oct. 29, 2013

(54) DATABASE SERVER, REPLICATION SERVER AND METHOD FOR REPLICATING DATA OF A DATABASE SERVER BY AT LEAST ONE REPLICATION SERVER

(75) Inventors: Heinz Kreuder, Messel (DE); Harald Schöning, Dieburg (DE)

(73) Assignee: Software AG, Darmstadt (DE)

( * ) Notice: Subject to any disclaimer, the term of this patent is extended or adjusted under 35 U.S.C. 154(b) by 222 days.

(21) Appl. No.: 12/805,051

(22) Filed: Jul. 8, 2010

(65) Prior Publication Data
US 2011/0066595 A1    Mar. 17, 2011

(30) Foreign Application Priority Data

Sep. 14, 2009 (EP) .................................... 09170180

(51) Int. Cl.
*G06F 17/00* (2006.01)
(52) U.S. Cl.
USPC .......................................................... 707/634
(58) Field of Classification Search
USPC ................................................ 707/683, 634
See application file for complete search history.

(56) References Cited

U.S. PATENT DOCUMENTS

| | | | |
|---|---|---|---|
| 6,304,882 B1 | 10/2001 | Strellis et al. | |
| 6,760,745 B1 * | 7/2004 | Tan et al. | 709/203 |
| 7,613,742 B2 * | 11/2009 | Bohannon et al. | 707/999.01 |
| 2004/0098425 A1 | 5/2004 | Wiss et al. | |
| 2005/0114285 A1 | 5/2005 | Cincotta | |
| 2006/0074941 A1 * | 4/2006 | Flynn et al. | 707/100 |
| 2007/0162516 A1 | 7/2007 | Thiel et al. | |
| 2007/0185973 A1 * | 8/2007 | Wayda et al. | 709/217 |

* cited by examiner

*Primary Examiner* — Dinku Gebresenbet
(74) *Attorney, Agent, or Firm* — Nixon & Vanderhye PC

(57) ABSTRACT

The present invention concerns a method for replicating data of a database server (10) by at least one replication server (20), the method comprising the following steps performed by the at least one replication server (20):
a. sending a database request (40) to the database server (10), wherein the database request (40) comprises metadata (421*c*, 421*d*) indicating replication data requested by the at least one replication server (20); and
b. receiving a database response (40') from the database server (10), wherein the database response (40') comprises the requested replication data indicated by the metadata (421*c*, 421*d*).

18 Claims, 10 Drawing Sheets

Figure 1:
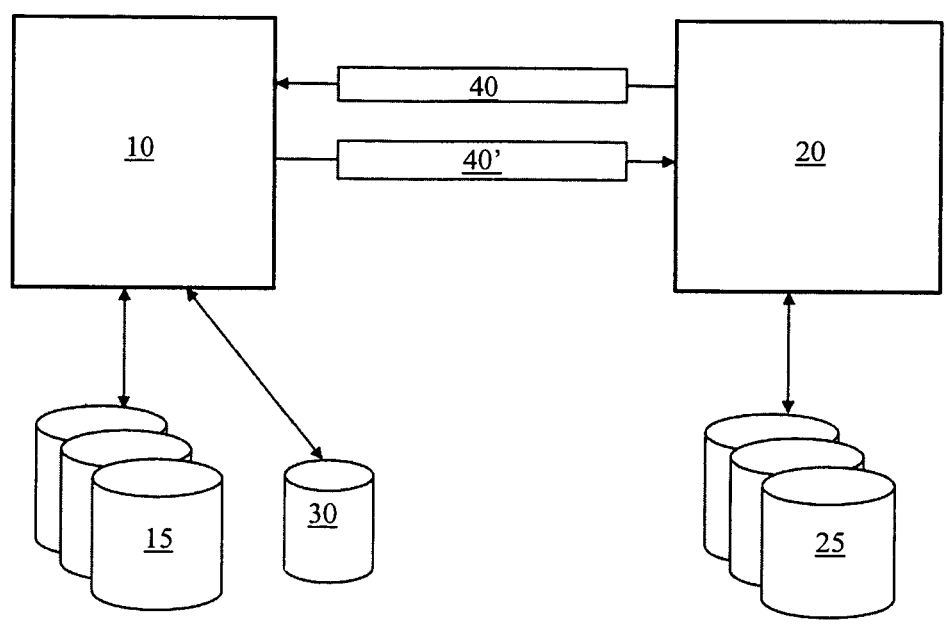

DATABASE SERVER, REPLICATION SERVER AND METHOD FOR REPLICATING DATA OF A DATABASE SERVER BY AT LEAST ONE REPLICATION SERVER

This application claims priority to EP Application No. 09170180.5 filed 14 Sep. 2009, the entire contents of which is hereby incorporated by reference.

1. TECHNICAL FIELD

The present invention relates to a database server, a replication server and a method for replicating data of a database server by at least one replication server.

2. THE PRIOR ART

In modern computing environments, database systems are commonly used for managing large amounts of data. The reliability of such database systems is of eminent importance, since an unexpected crash or inconsistency in a database system may result in inacceptable down-times of the underlying computing environments until the database system is restored and the data is recovered. One way of improving the availability of a database system is replicating the data of the database system to one or more backup databases, so that the backup database(s) can stand by for replacement in case of failure of the primary database. Furthermore, the one or more replicated backup databases may also be used for load-balancing database requests, i.e. for distributing the processing of such requests among the primary database and the backup database(s) in order to improve the overall efficiency of database processing.

Replication techniques known from the prior art are often based on duplicating or mirroring the data on a plurality of distinct physical database disks during operation of the primary database. Copying large amounts of data in realtime, however, is disadvantageous, since it binds processing power and network resources needed for the operation of the primary database and thereby decreases the performance of the database system.

Other known replication techniques rely on using transaction log data of a database system as a base for replication methods. A transaction log (also called redo log) generally refers to a portion of a database system that logs all modifications performed on the database, such as the creation, update and deletion of database entries. Based on the information in the redo log, the replication database may perform the logged modifications locally, resulting in a replication database's state that equals the primary database's state. One way to achieve this is sharing the redo log data between the server of the database to be replicated and the replication database by using shared disks. Using shared resources, however, may require complex synchronization efforts when writing and reading data simultaneously. Furthermore, using replication in this context is restricted to environments where such shared resources are possible.

Another approach is copying the transaction log files of the primary database to the replication database, as e.g. disclosed in the US 2007/0162516 A1. Accordingly, a destination database receives file change notifications from the operating system of the source machine when a new source transaction log file is created at the source machine. The source transaction log file is then copied to a destination transaction log directory located at the destination database. However, such replication methods that are based on processing whole transaction log files as smallest unit do not allow a real-time database replication due to the latency involved, i.e. the time that is needed by the replication database to perform all modifications logged in a received transaction log file.

Another approach disclosed in the US 2004/0098425 A1 is mirroring the transaction log file between the primary and the replication database synchronously, i.e. mirroring each individual transaction as soon as it is performed on the primary database. However, such a synchronous mirroring of the transaction log considerably slows down the data throughput of the database system environment due to additional I/O activity via a network connection between the primary and replication database.

The US 2005/0114285 A1 discloses a special device driver in the primary database system that intercepts the data to be written onto the transaction log on the local disk and sends this data to the replication processor on the target machine. Besides resulting in similar performance problems as discussed above, this approach requires additional resources and complex processing logic on the primary database, since the data must be preserved at the primary database using an intermediate storage buffer in case of network outage or other reasons why the data cannot be delivered to one of the replication processors.

It is therefore the technical problem underlying the present invention to provide a more efficient and less resource-intensive approach for replicating data of a database system that at least partly overcomes the above explained disadvantages of the prior art.

3. SUMMARY OF THE INVENTION

This problem is according to one aspect of the invention solved by a method for replicating data of a database server by at least one replication server in accordance with claim 1, wherein the method comprises the following steps performed by the at least one replication server:

a. sending a database request to the database server, wherein the database request comprises metadata indicating replication data requested by the at least one replication server; and b. receiving a database response from the database server, wherein the database response comprises the requested replication data indicated by the metadata.

The present invention also relates to a method for replicating data of a database server in accordance with claim 2, wherein the method comprises the following steps performed by the database server:

a. receiving a database request from at least one replication server, wherein the database request comprises metadata indicating replication data requested by the at least one replication server; and b. sending a database response to the at least one replication server, wherein the database response comprises the requested, replication data indicated by the metadata.

Accordingly, in contrast to the prior art, the present invention utilizes database requests initiated by the at least one replication server and corresponding database responses by the database server as a transport mechanism for replication data. This concept is based on the observation that it is not acceptable to slow down updates of the database of the database server caused by sending data to a replication server in a synchronous manner or by the overhead of preserving information when a replication server is not available, as in the prior art. By contrast, the workload is concentrated at the at least one replication server, i.e. the overall replication process is no longer controlled by the database server, but by the at least one replication server. In other words, the present invention provides a change of perspective, in that replication data is no longer 'pushed' from the database server to the at least one replication server, but rather 'pulled' by the at least one replication server upon request. This reduces the workload and required processing power of the (primary) database server, thereby increasing its performance to a great extent. This aspect is especially advantageous, since it allows to easily provide any desired number of replication servers each controlling their respective replication processes. In the prior art, on the contrary, each additional replication server decreases the overall performance of the primary database server, since the latter has to keep track of the replication processing. As a result, only few replication servers can be provided in the prior art without negatively affecting the efficiency of the primary database server.

More precisely, in the above embodiment of the invention the at least one replication server indicates in its database request which (part of the) replication data it wants to retrieve, so that the database server does not have to keep track of which data has already been replicated. This is achieved by sending a database request comprising metadata indicating the replication data requested by the at least one replication server. The metadata may be comprised in an additional header of the database request message, as further explained in the detailed description below. The database server then returns the requested replication data in a database response. The database requests may be issued by the at least one replication server periodically or in any other suitable manner. Since the requests of the at least one replication server are preferably 'wrapped' in a conventional database request message, the receiving database server may treat the database request like any other conventional database request (e.g. for modifying the data of the database controlled by the database server). This enables an especially simple and seamless integration of the replication server abilities into existing database servers.

Furthermore, the latency of the at least one replication server, i.e. the time difference between an update at the database server and the receiving of the replication data by the at least one replication server, depends only on the environment, the workload and/or the frequency of issued database requests of the at least one replication server. Applicant has found that if the frequency is selected reasonably, the latency is less than a few seconds, which is adequate in most application scenarios.

In another aspect of the present invention, the database response may comprise additional metadata, wherein the method may comprise the step of using the additional metadata by the at least one replication server to indicate requested replication data in at least one subsequent database request. Accordingly, the at least one replication server may use the additional metadata returned within the database response to determine which replication data to request next in a subsequent database request.

Furthermore, the replication data requested by the at least one replication server may relate to redo log data stored in a redo log of the database server, wherein the metadata may comprise a block number and/or a position indicating the redo log data requested by the at least one replication server. Additionally or alternatively, the additional metadata may comprise a size of the redo log data returned by the database server, wherein the method may comprise the further step of calculating, by the at least one replication server, the block number and/or the position of redo log data requested in at least one subsequent database request based on the size of the returned redo log data.

Accordingly, the at least one replication server preferably retrieves subsequent redo log data from the database server by supplying metadata such as the block number and/or position of the already processed redo log data within a database request sent to the server of the database to be replicated. This may be achieved by maintaining the metadata within the replication server in a self-contained way, so that the database server does not have to keep any information about any replication server. On the contrary, each replication server knows which replication data has already been processed and which replication data is next to be processed. Furthermore, the additional metadata comprised in the database response enables the at least one replication server to get back-additional information about the provided replication data, which is preferably used for determining the replication data that still has to be retrieved in subsequent database requests. The received metadata may e.g. be stored locally at the at least one replication server. Preferably, the metadata is stored in a non-volatile memory such as a harddisk, which enables a seamless resuming of the replication process even in case the at least one replication server has been offline and/or restarted between two database requests.

Furthermore, the present invention is not based on copying whole transaction/redo log files, as in the prior art, but on efficiently transferring portions of redo log data within the database requests/responses (indicated by the above-mentioned metadata), which greatly reduces the required network bandwidth as well as the latency of the at least one replication server. Moreover, when using a database request to deliver the redo log data, the redo log of the database to be replicated is the only resource required, hence zero loss of committed transactions is automatically guaranteed. This is because there is no need for copying the redo log data synchronously to another file, as in the prior art. Since the database server has full control about the redo log file, synchronization with actions such as closing and/or opening a new redo log file and/or moving a closed redo log file to an archive location may be done without impact on the replication process.

In yet another aspect of the invention, the method may comprise the further step of reading, by the database server, the requested redo log data from at least one redo log output buffer stored in a memory of the database server, or if the requested redo log data is not available in the at least one redo log output buffer, reading the requested redo log data from the redo log of the database server. Accordingly, in case the redo log data requested by the at least one replication server is still held in memory buffers of the database server, the database request can be served without any I/O processing (i.e. without accessing the redo log which is preferably stored on a disk of a physical machine where the database server process is running). Instead, the requested replication data is directly obtained from the memory of the database server, which is apparently much faster than a disk access.

Moreover, database requests for replication purposes may be supplied with a priority to schedule such requests in favor of user requests or vice versa. Database requests sent in parallel by multiple replication servers may be processed with a minimum synchronization effort in the same way as with other conventional database requests.

In yet another aspect of the invention, the method may comprise the further steps of receiving an authorization request from the at least one replication server at the database server, validating the authorization request and, depending on the result of the validation, creating a client entry in the database server identifying the at least one replication server. Moreover, any database requests received from the at least one replication server may only be processed by the database server, if a client entry is present in the database server identifying the at least one replication server. For security reasons, replication data must not be returned to an unauthorized entity. Accordingly, the database server only processes database requests relating to replication data if the requesting replication server has successfully registered with the database server through an authorization request beforehand.

Furthermore, the database request sent by the at least one replication server may be processed by the database server based on a predefined scheduling priority. Accordingly, processing the database request by the database server (which is preferably a multi-threaded server) may involve a special scheduling priority for replication requests that may be different from other conventional database requests. This aspect is especially advantageous, since it enables either a preferred handling of requests of a replication server, or to favour conventional user requests (i.e. requests for manipulating and querying the data of the primary database), depending on the predefined scheduling priority. This way, system resources of the database server can be spent in a more efficient way than e.g. sending replication data synchronously by a separate concurrent process, as in the prior art.

In another aspect, the replication data requested by the at least one replication server may relate to at least one mass load input file of the database server. The processing of mass load data is further explained in the detailed description below.

Moreover, the database request may comprise a replication data buffer generated by the at least one replication server and the database response may be generated by the database server by inserting the requested replication data into the replication data buffer of the database request. Accordingly, it is the at least one replication server that determines the size of the replication data transmitted in a database response. This is because the at least one replication server sets up the database requests with a (preferably empty) replication data buffer of a predetermined size (e.g. 32 KB), so that the database server only has to fill in the requested replication data into this buffer. The filled in database request is then sent back to the at least one replication server and thus acts as the database response. This enables retrieving any replication data by the at least one replication server, wherein the size of the retrieved data is only limited by the buffer size used with in the database request/response. This way, the at least one replication server is able to decide on the size of the replication data 'chunks' received by the database server. The database server, on the other hand, knows if there is new replication data to be sent since the last request received from the replication server. The new replication data is then transmitted according to the predetermined buffer size, i.e. also only a small 'chunk' of replication data may be transmitted per database response. The at least one replication server may decide whether to send further database requests immediately or according to a predetermined time interval, e.g. when currently no more replication data is available.

Furthermore, in case the database server is unavailable, e.g. due to network problems, when the at least one replication server sends a database request, the database response may return the information that the database server is not available. The replication processing may be continued as soon as database server is available again. In case the at least one replication server is shut down or aborted for any reason, the stored information about the last processed transactions (derived from the metadata comprised in the database requests/responses) may be used to resume the processing after the at least one replication server is restarted. To this end, the at least one replication server may store the needed information on a disk or any other non-volatile storage means.

The present invention also concerns a database server, comprising:
a. an interface adapted for receiving a database request from at least one replication server, wherein the database request comprises metadata indicating replication data requested by the at least one replication server; and
b. a processing means adapted for generating a database response for the at least one replication server, wherein the database response comprises the requested replication data indicated by the metadata.

Moreover, the present invention relates to a replication server, comprising:
a. a processing means adapted for generating a database request for a database server, wherein the database request comprises metadata indicating replication data requested by the at least one replication server; and
b. an interface adapted for receiving a database response from the database server, wherein the database response comprises the requested replication data indicated by the metadata.

Further advantageous modifications of embodiments of the database server and the replication server of the invention are defined in further dependent claims.

Lastly, the present invention is directed to a system comprising a database server and at least one replication server as described above.

4. SHORT DESCRIPTION OF THE DRAWINGS

Figure 2:
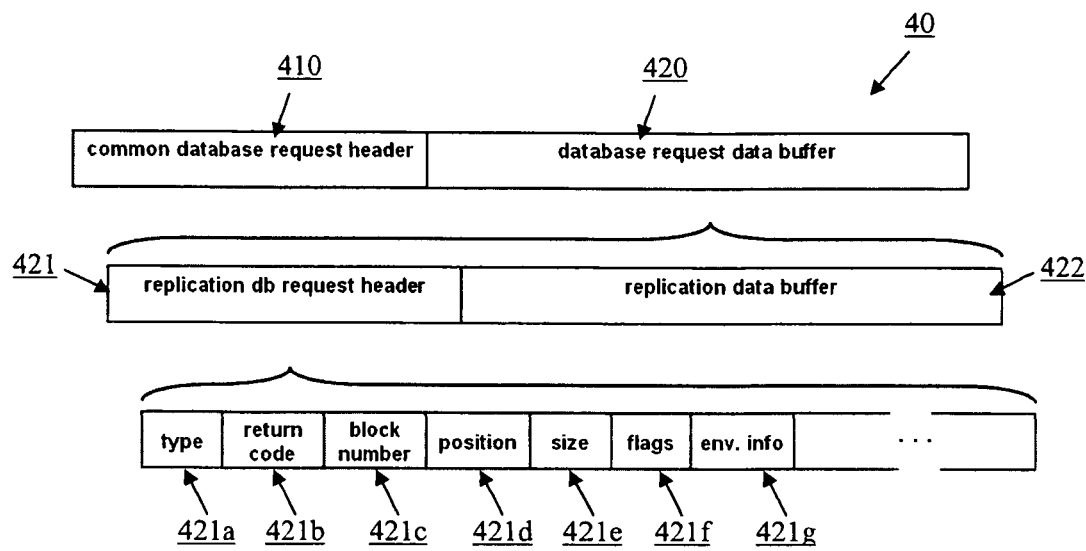
Figure 3A:
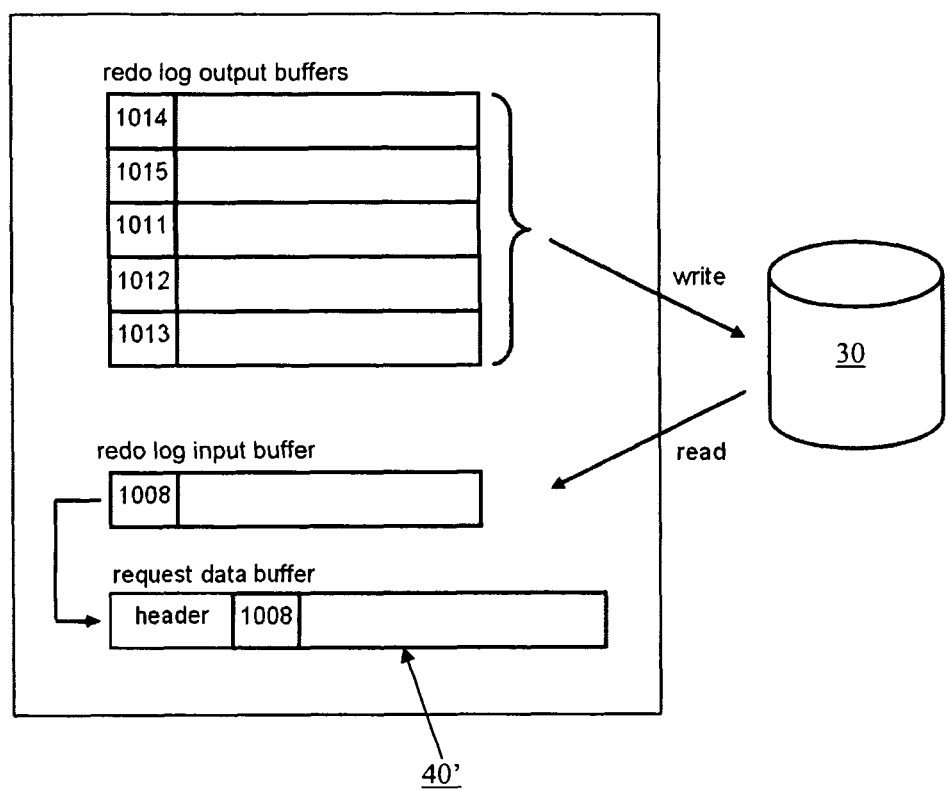
Figure 4A:
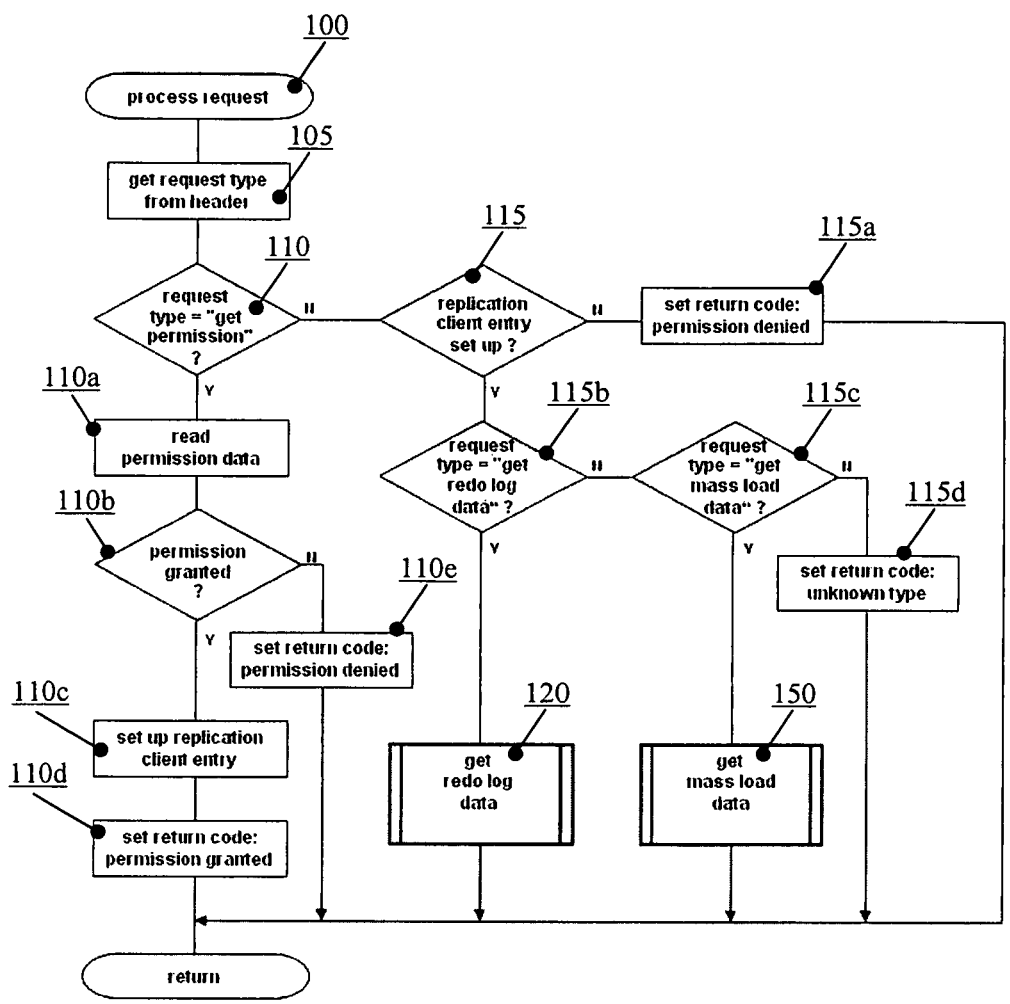
Figure 4B:
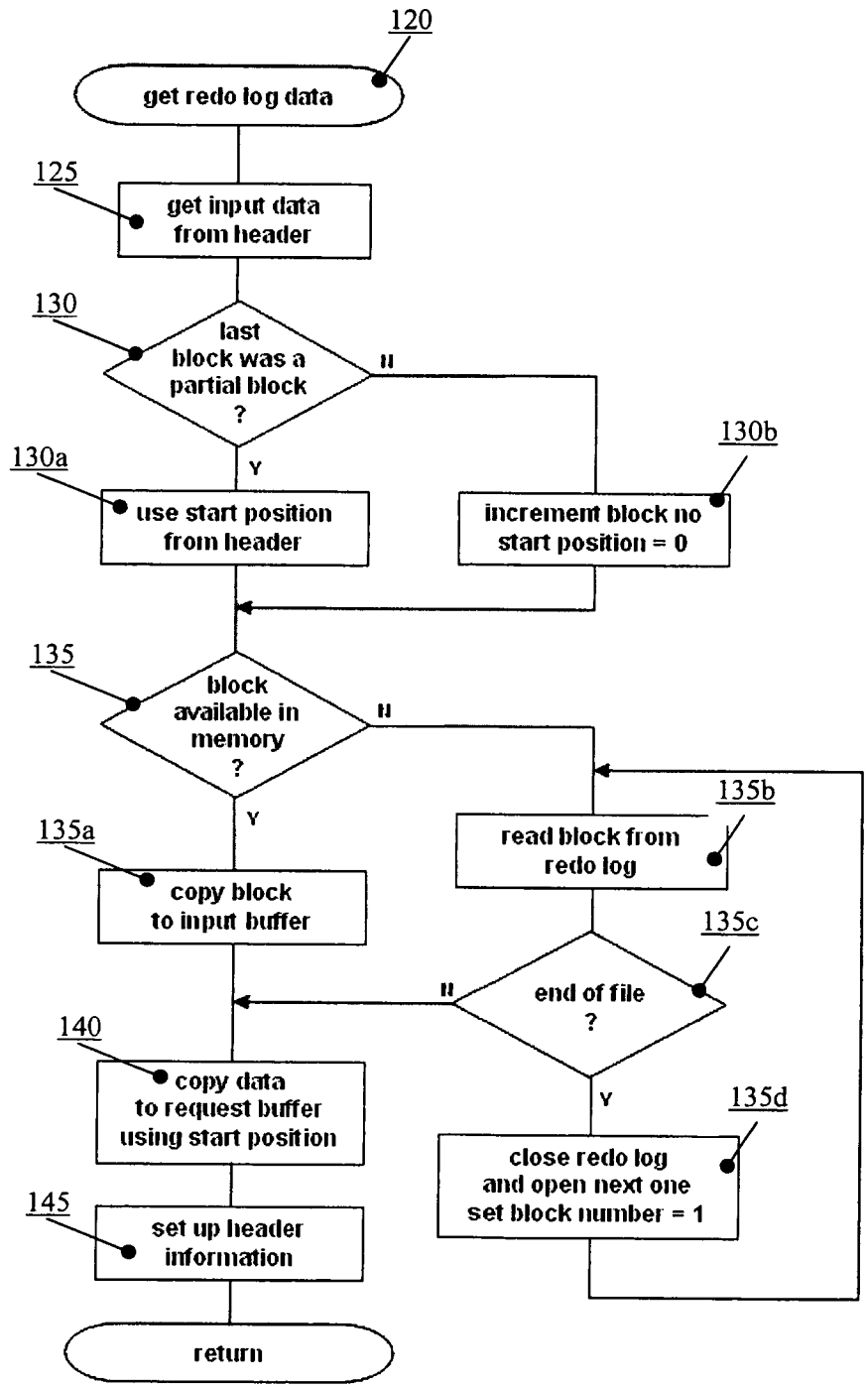
Figure 4C:
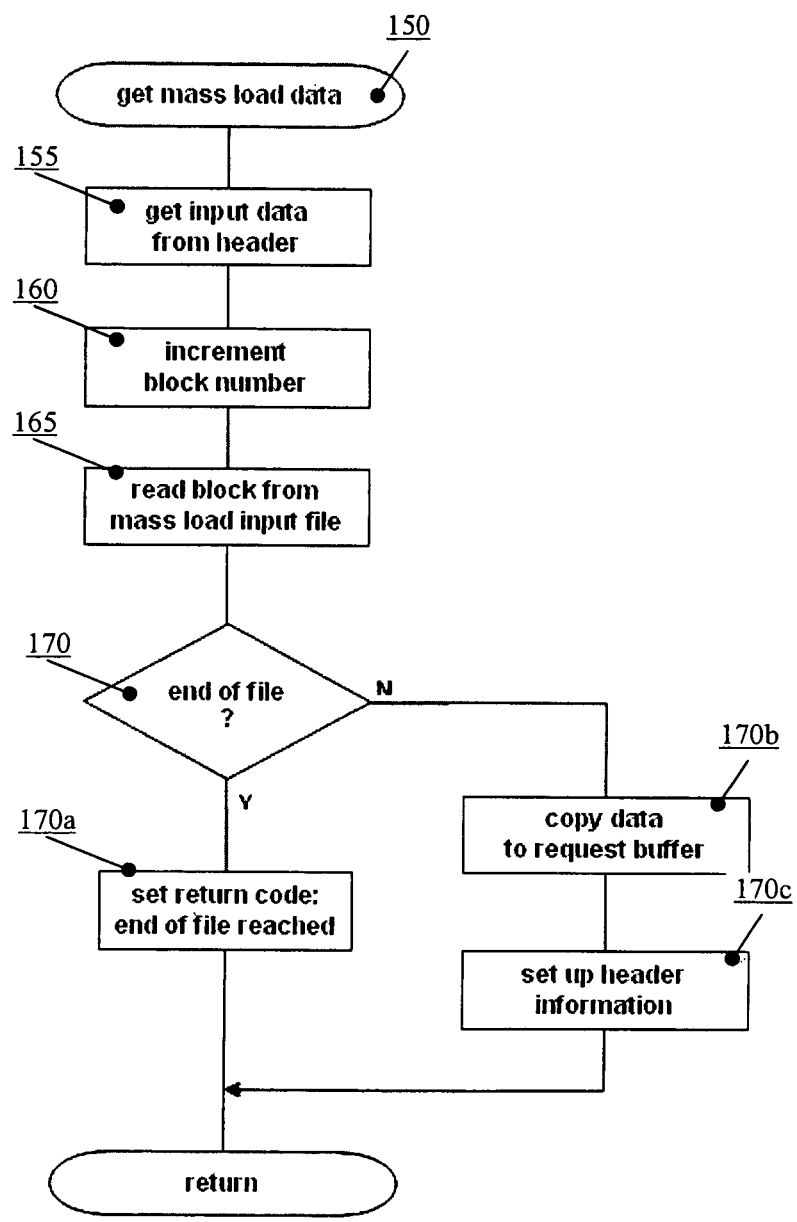
Figure 5A:
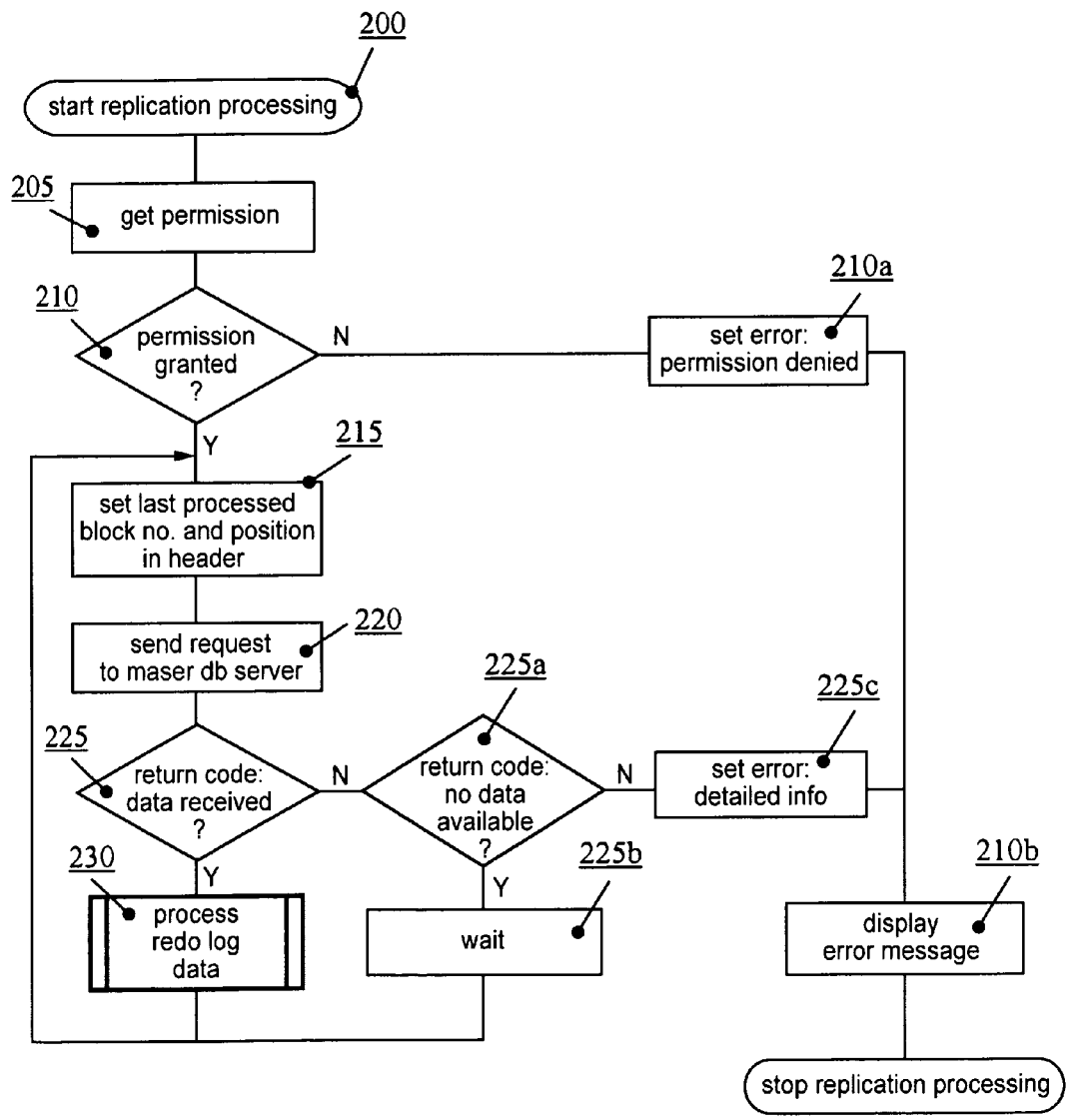
Figure 5B:
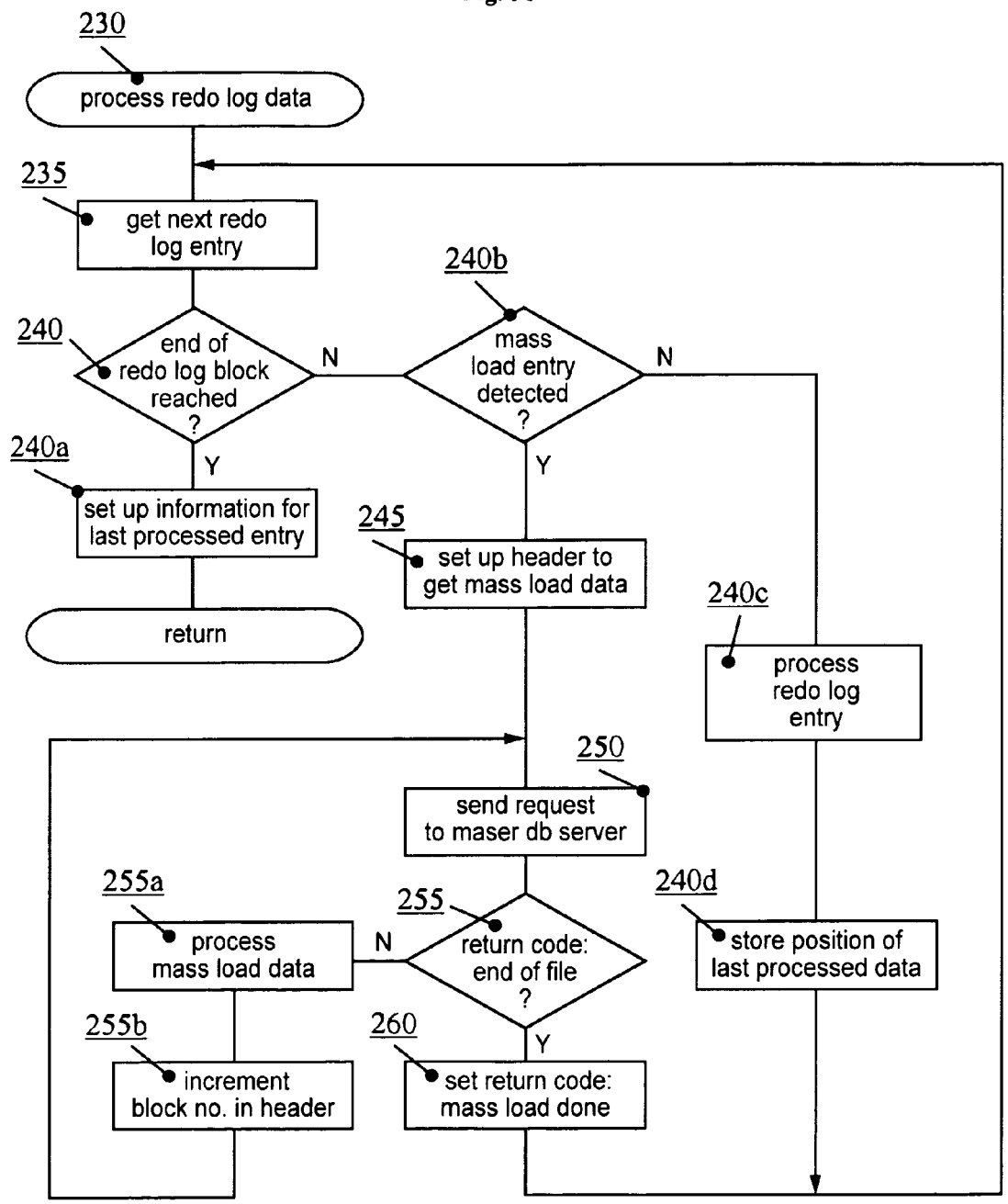
Figure 6A:
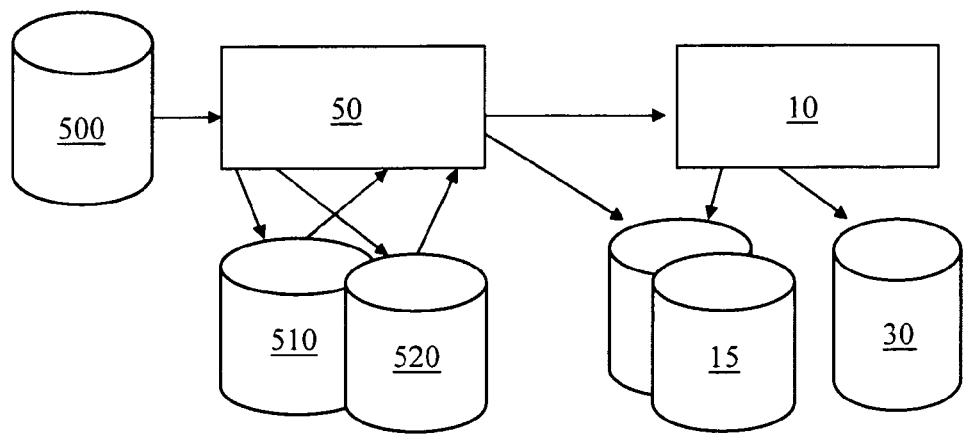

In the following detailed description, presently preferred embodiments of the invention are further described with reference to the following figures:

FIG. 1: A schematic overview of a database server and a replication server according to an embodiment of the present invention;

FIG. 2: A schematic overview of a database request used for communicating replication data according to an embodiment of the present invention;

FIG. 3*a,b*: Schematic overviews of the processing of a request for redo log data according to an embodiment of the present invention;

FIG. 4*a*: A flowchart of the processing of a replication request by a database server according to an embodiment of the present invention;

FIG. 4*b*: A flowchart of the processing of a replication request for redo log data by a database server according to an embodiment of the present invention;

FIG. 4*c*: A flowchart of the processing of a replication request for mass load data by a database server according to an embodiment of the present invention;

FIG. 5*a*: A flowchart of the processing of a replication server according to an embodiment of the present invention;

FIG. 5*b*: A flowchart of the processing of a replication request for redo log data by a replication server according to an embodiment of the present invention;

FIG. 6*a*: A schematic overview of a mass load processing according to an embodiment of the present invention; and FIG. 6*b*: A schematic overview of a mass load replication according to an embodiment of the present invention.

5. DETAILED DESCRIPTION

In the following, a presently preferred embodiment of the invention is described with respect to FIG. 1. As can be seen, a database server 10 is in communication with one or more primary databases 15 and a redo log 30. Furthermore, a replication server 20 is in communication with a replication database 25. Apparently, FIG. 1 only shows a simplified example, whereas more complex scenarios may comprise a plurality of replication servers 20.

Replication of data of the primary database 15 controlled by the database server 10 is supported by providing special database request types to transport replication data. To this end, the replication server 20 sets up a database request 40 with information about replication data to be retrieved, sends the database request 40 to the database server 10 and preferably waits for a response. When the database server 10 receives the database request 40, the database request 40 may be scheduled to be processed. The database server 10 processes the database request 40 by supplying the requested replication data within a buffer of a database response 40'. As will be explained in more detail further below, the database request 40 may to this end comprise metadata indicating e.g. the position and/or size of the replication data that has already been processed by the replication server 20. The database server 10 may then, based on this metadata and the replication data currently available at the database server 10, determine the position and/or size of the further replication data to be sent to the replication server 20. This information may be inserted as additional metadata into the database response 40'. When the replication server 20 receives the database response 40', the replication data can be processed by the replication server 20. Processing the replication data may e.g. comprise processing redo log data comprised in the replication data and performing the database transactions logged in the redo log data locally at the replication server 20, so that the replication database 25 is up to date in accordance with the primary database 15. It is to be noted that the replication server 20 preferably processes each replication data portion immediately upon receipt of the respective database response, so that there is no need to store the replication data or complete mirrored redo log files at the replication server, as in the prior art. Furthermore, additional metadata comprised in the database response 40' provided by the database server 10 may be stored at the replication server 20 in order to be used when setting up a subsequent database request 40 to get subsequent replication data.

FIG. 2 shows a data structure which may be used for the database request 40 and/or the database response 40' and which is preferably used for any communication between the database server 10 and the replication server 20. As can be seen, a common database message header 410 is used for providing e.g. information about the originator of the request/response. Furthermore, a data buffer 420 is reserved for storing the payload of the request/response message. The database data buffer 420 itself comprises a replication specific header 421 to identify the requested replication data as well as a replication data buffer 422, in which the replication data is to be returned by the database server 10. The replication specific header 421 is used by the requestor (the replication server 20) to specify metadata such as a request type 421*a*, a block number 421*c* and/or a position 421*d* of the requested replication data. Preferably, the block number 421*c* and the position 421*d* indicate the replication data already processed by the replication server 20. Moreover, additional meta-information about the environment 421*g* may be provided (e.g. a version number). After having processed a request message 40, the database server 10 may modify the replication specific header 421 to provide additional metadata such as a size 421*e* and/or additional information about the returned data, such as a return code 421*b* and/or additional flags 421*f*.

In the following, the processing of a database request 40 used for the transport of redo log data is described with reference to FIGS. 3*a* and 3*b*. Generally, when the database server 10 receives a user request for modifying the data of the database 15 (e.g. for creating, updating or deleting entries in the database), the database server logs the performed modifications in a number of redo log output buffers, which are maintained in the memory of the database server 10, as shown in FIG. 3*a*. The redo log output buffers are, e.g. periodically or upon request, written/flushed to the redo log 30 of the database server 10, which is located on a non-volatile memory such as a harddisk. The redo log 30 preferably comprises a number of consecutive redo log files 30, wherein each redo log file 30 comprises a number of blocks storing the individual modifications. In summary, a redo log buffer may be understood as a piece of memory of the database server process in which data of a block of the redo log is located.

Since harddisk accesses (also called I/O accesses) are extremely slow as compared to memory accesses, processing a redo log data request 40 by the database server 10 is done in an especially advantageous way that avoids unnecessary I/O accesses. To this end, when generating the database response 40', the database server 10 reads the requested replication data (the redo log data) from the (slow) disk, only if it is no more available within the (fast) redo log output buffers within the memory of the database server 10 (cf. FIG. 3*a*). Otherwise, the requested replication data is only copied within the internal memory of the database server 10 (cf. FIG. 3*b*), which greatly improves the overall performance.

FIG. 4*a* shows the processing steps performed by the database server 10 when processing a database request 40. It should be appreciated that several of the following processing steps may be performed in a different order as described, or may be omitted entirely, while still providing some of the advantages of the present invention. As can be seen, the processing starts at step 100. The database server 10 then determines in step 105 the request type 421*a* (cf. FIG. 2) comprised in the replication request header 421 of the database request 40. The request type 421*a* indicates the type of database request to be processed by the database server 10. In the following, three types of database request will be explained in more detail: authorization requests, requests relating to redo log data and requests relating to mass load data.

For security reasons, replication data must not be returned to an unauthorized entity. The database server 10 therefore checks in step 110 whether the database request 40 is an authorization request (e.g. by checking if the request type 421*a* of the database request 40 equals to 'get permission', as depicted in FIG. 4*a*). Preferably, the database server 10 expects an authorization request as the first database request 40 from a replication server 20 that wants to obtain replication data and otherwise refuses to process any database requests 40 from this replication server 20. Within the request buffers of the authorization request 40, information is provided which can be read by the database server in step 110*a* and based on which the database server 10 can decide in step 110*b* whether the requesting replication server 20 is permitted to get replication data or not. To this end, the authorization request 40 may comprise an id and password within its request buffers or any other suitable authorization credentials. If the replication server 20 is authorized successfully in step 110*b*, a client entry is created within the database server 10 (preferably in an attached memory) in step 110*c*, which will be checked with each subsequent replication data request (see further below). Moreover, if the authorization was successful, a return code 'permission granted' may be returned to the replication server 20 in step 110d, otherwise a return code 'permission denied' may be returned in step 110e. If the database server determines that the request type 421a does not equal to 'get permission' in step 110, i.e. the database request 40 is not an authorization request, the database server 10 checks if a client entry for the requesting replication server 20 has already been created in step 115. If not, the database server 10 returns a return code 'permission denied' to the replication server 20 in step 115a. It should be appreciated that, while the above-explained authorization steps greatly improve the security of the overall system, they could be implemented independently from the further processing described in the following.

Subsequently, it is checked whether the database request 40 is a request for redo log data (step 115b) or a request for mass load data (step 115c) and a corresponding series of processing steps is initiated in steps 120 and 150, which are explained in more detail below. If all of the above checks fail, a return code 'unknown type' may be returned to the replication server 20 in step 115d.

FIG. 4b shows the processing performed by the database server 10 when receiving a database request 40 relating to redo log data (cf. step 120). First, the database server 10 reads the header information of the database request 40 in step 125. For a near real-time replication, redo log data is preferably transported as partial blocks, i.e. each individual database response 40' comprises only a portion of the block to be read from the redo log data. To this end, the header information/metadata inserted by the replication server 20 into the database request 40 identifies which replication data the replication server 20 had already received in the last request (preferably by indicating the block number, position and/or size of the last received replication data). Based on this information, the database server 10 determines, whether the replication data that is next to be sent is comprised in the same block or in a subsequent block of the redo log data. In case a subsequent block does not exist yet (e.g. because it has not been written to the redo log), the current block to be sent may be expanded, i.e. it may be marked as a partial block.

More specifically, it is determined in step 130 whether the last returned block (i.e. the block last requested by the replication server 20) was a partial block. If so, the position 421d comprised in the metadata of the database request header is used for the further processing (step 130a). Otherwise, i.e. if the last block was not a partial block but a full block, the block number 421c retrieved from the header information is incremented and the start position 421d is set to '0' (step 130b). Generally, replication servers 20 may experience some latency when the replication processing is not possible for some reason such as network connection problems. Returning redo log data is then performed using full blocks as long as the returned block is not the current one.

The following example shows in more detail the processing of the database server 10 when providing the replication data. In the following table, the column 'input metadata' shows the metadata comprised in the header of a database request 40 received by the database server 10, the column 'current block' shows information about the redo log block currently expanded/written by the database server 10 and the column 'output metadata' shows the metadata produced by the database server 10 which is sent back to the replication server 20 in the database response 40':

| input metadata | | current block | | output metadata | | | |
|---|---|---|---|---|---|---|---|
| block no. | position | block no. | size | block no. | position | size | state flags |
| 1111 | 0 | 1111 | 12760 | 1111 | 0 | 12760 | partial |
| 1111 | 12760 | 1112 | 8405 | 1111 | 12760 | 20008 | partial (remainder) |
| 1112 | 0 | 1114 | 16440 | 1112 | 0 | 32768 | full block |
| 1113 | 0 | 1114 | 16440 | 1113 | 0 | 32768 | full block |
| 1114 | 0 | 1114 | 16440 | 1114 | 0 | 16440 | partial |
| 1114 | 16440 | 1114 | 16440 | 1114 | 16440 | 0 | no more data |

As can be seen, during the first database request 40, the replication server 20 requests replication data starting at block no. '1111' and position '0' (cf. line one in the above table). Since this is the first request to be answered by the database server 10 in the example, the database server 10 fills the current block to be returned to the replication server 20 with the respective data and returns it in a database response 40', which in addition to the replication data comprises output metadata identifying the block no. '1111', the position '0', the size of the returned replication data of '12760' and a state flag that indicates that the returned block is a partial block.

When the replication server 20 sends a subsequent database request 40 in order to obtain subsequent replication data, it transmits the block no. '1111' and position '12760' in the metadata (cf. line 2 of the above table), since this identifies the amount of data already processed by the replication server 20. The database server 10 can then fill the current block with the needed replication data (in this case the remaining data of the partial block sent in the last database response 40'). This is indicated in the output metadata comprised in the second database response 40', identifying the block no. '1111', the position '12760', the size '20008' and a state flag identifying the sent data as the last part of a partial block.

If data of a block is sent, whose subsequent block does not yet exist, it may be expanded with the redo log data of processed transactions since responding to the last replication data request. Then, the expanded part of the respective block has to be sent during the next request. If a subsequent block exists, the sent data is either the remaining part of a partial Block (indicated by a position>0 in the output metadata and/or the state flag(s)) or a full block (position=0 and/or the state flag(s)).

Figure 3B:
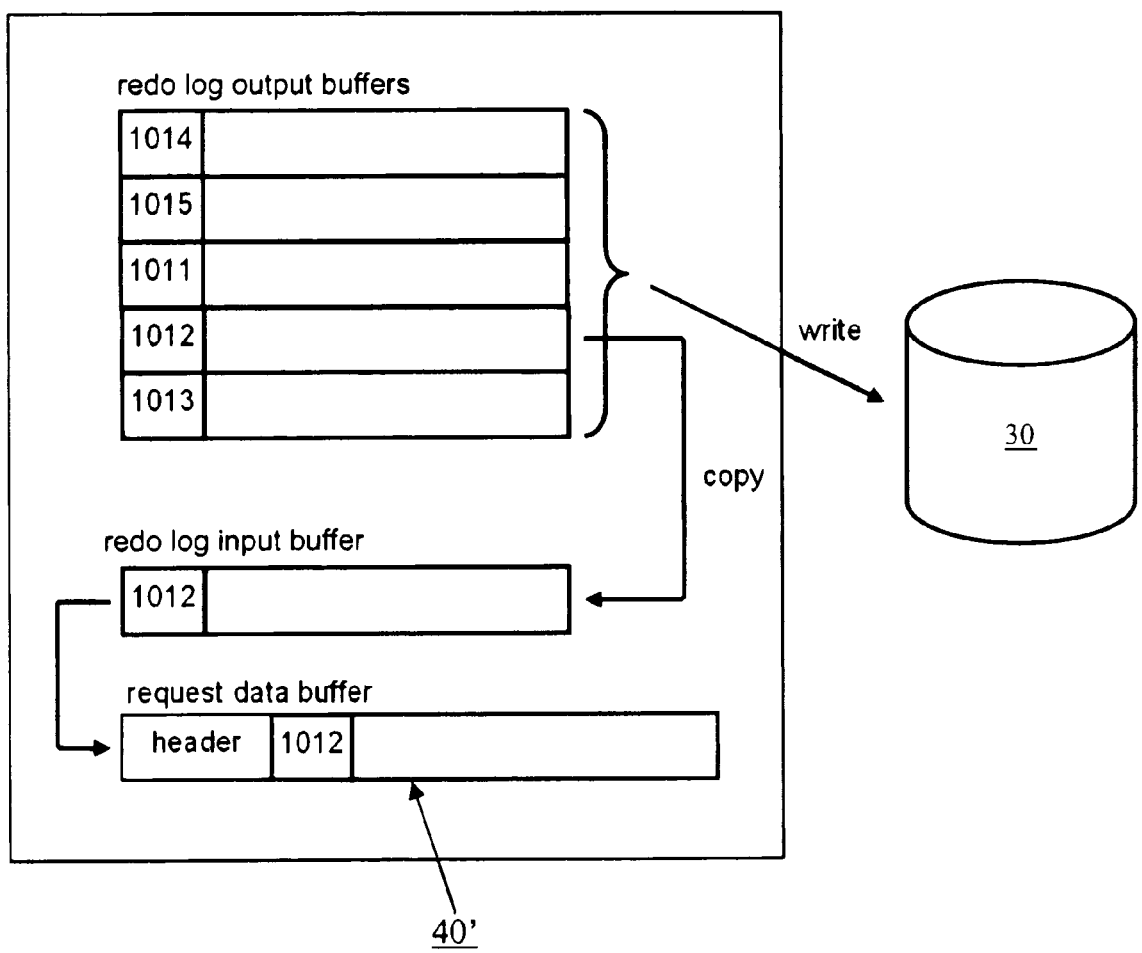

During the processing of the database request(s) 40 by the database server 10, it is determined in step 135 (cf. FIG. 4b), whether the requested block is available within the memory of the database server 10 (cf. FIGS. 3a and 3b). If so, the requested block is copied from the memory directly into a redo log input buffer (cf. FIG. 3b) in step 135a. Otherwise, the requested block is read from the redo log 30 stored on the disk (cf. FIG. 3a) and copied into the redo log input buffer in step 135b. In the latter case, it is additionally checked in step 135c whether the end of the currently read redo log file 30 is reached, and if so, the current redo log file 30 is closed and the next (consecutive) redo log file 30 is opened while setting the block number to '1' in step 135d. The processing returns in this case to step 135b to read the next block from the new redo log file 30. This is because a replication server 20 may still request data from a redo log file 30 prior to the one currently written to disk. Detecting an 'end of file' condition when trying to read the next block of a redo log file is an indicator to perform a redo log file switch: the file used for returning data with the previous request is dosed, the subsequent redo log file is opened and the block number to be read is set to the first block.

Finally, the data gathered in the redo log input buffer is copied in step 140 into the replication data buffer 422 of the database request 40, which therefore effectively represents the database response 40'. After adding additional metadata into the header of the database response 40' in step 145 (see further above), the database response 40' is returned to the replication server 20.

In times of low volume of update data, i.e. modifications to the database 15 of the database server 10, one or more transactions may already have been committed, i.e. processed and flushed to the redo log 30, when a request for redo log data is received by the database server 10. Although data within the block can be expanded, as described above, the data available and already written to disk can be returned with the size of the data set up in the header. When processing a subsequent replication data request 40, the database server 10 will detect, based on the information set up in the header, that the block returned with the previous request may have been expanded. In this case only the appended part of the block is returned with the additional information that the data returned is a partial block (see above).

FIG. 4c shows the processing performed by the database server 10 when receiving a database request 40 relating to mass load data (cf. step 150). Generally, processing the redo log data by a replication server 20 may refer to one or more input files used for a mass load or another similar utility action. To transport the input data, a 'get mass load data' request is used (cf. step 115c in FIG. 4a). Since information about a mass load is preferably written to the redo log 30 when the mass load process is completed, the database server 10 returns the mass load input data block by block until the end of the input file is detected. Looking more in detail at FIG. 4c, the database server 10 first reads the header information of the database request 40 in step 155 and increments the block number in step 160. The respective block is then read from the mass load input file in step 165. If an 'end of file' condition is detected in step 170, the database server returns a return code 'end of file reached' to the replication server 20 in step 170a. Otherwise, the gathered data is copied to the request buffer in step 170b, the header information is set up in step 170c and the database response 40' is returned to the replication server 20. The metadata transmitted in the database response 40' may indicate e.g. the block number and/or the size of the sent block and/or a data type such as 'data' and/or 'index'.

The general processing of a mass load by the database server 10 is explained in more detail in connection with FIG. 6a. The mass load processing involves two phases: Firstly, a mass load process 50 processes one or more input files 500, e.g. XML files, comprising raw data to be inserted into the primary database(s) 15 of the database server 10. The raw data is then transferred by the mass load process 50 into an internal file and/or index format, which is then written into respective mass load data file(s) 510 and/or mass load index file(s) 520. Secondly, the mass load process 50 synchronizes with the database server process 10 and uses the prepared mass load data file(s) 510 and/or mass load index file(s) 520 in order to mass-load the data into the primary database(s) 15 and/or to generate respective indexes. The above-presented mass load processing is especially advantageous, since the storing of the mass load data 510, 520 enables an efficient mass load recovery. Furthermore, the mass load data 510, 520 may be compressed and therefore requires less space than the original input files 500. Lastly, an efficient replication of the mass load is possible, as will be further explained in the following in connection with FIG. 6b.

Figure 6B:
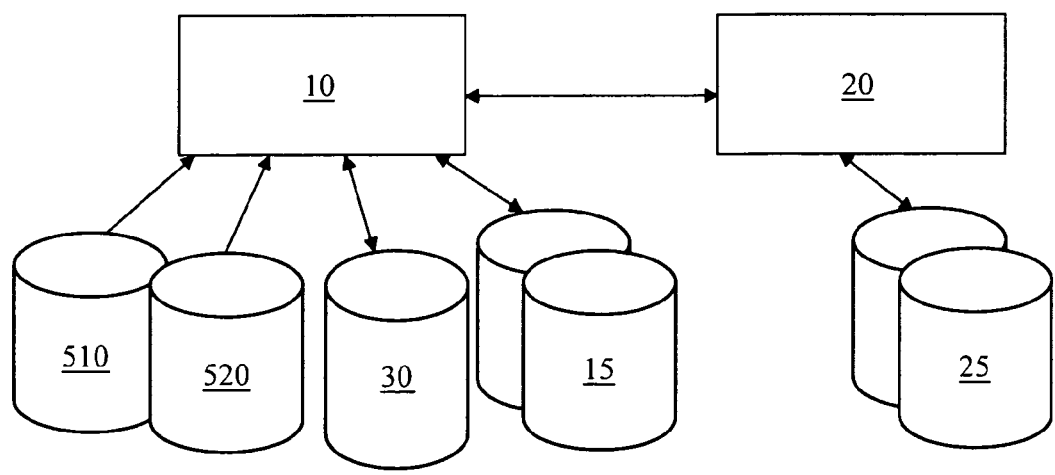

After the mass load process 50, the redo log 30 of the database server 10 comprises a corresponding entry indicating that the mass load 50 is finished and/or parameters for identifying the mass load data 510, 520 (cf. FIG. 6b). When the replication server 20 identifies such an entry within the requested replication data, it requests the respective mass load data 510, 520 in order to replicate the mass load process 50. After all mass load data 510, 520 has been processed block by block, the processing of the redo log 30 is resumed as already described further above.

It is noted that, while FIG. 6b shows the mass load data 510 and the mass load index 520 as two distinct entities/files, both types of data may be alternatively stored in one combined file (preferably together with a parameter identifying the type of data, i.e. data or index).

Referring to FIG. 5a, the processing steps performed by the replication server 20 are explained in more detail in the following, starting at step 200. As already explained further above, a database request 40 of the type 'get permission' (i.e. an authorization request) is used at startup of a replication server 20 to register the replication server 20 at the database server 10. This authorization request is generated and sent to the database server 10 in step 205. In the subsequent step 210, it is determined if the database server 10 has granted permission to the requesting replication server 20 (cf. steps 110, 110a, 110b, 110e, 115 and 115a in FIG. 4a). If not, an error message 'permission denied' is generated in step 210a and displayed in an error message at the replication server 20 in step 210b. Otherwise, i.e. if the replication server 20 is authorized successfully, the replication processing is started or continued using the information about the last processed redo log data (step 215) to set up the block number 421c and position 421d in the header 421 of the 'get redo log data' database request 40, which is then sent to the database server 10 in step 220. When data is returned in response to this request (step 225), the redo log data is processed in step 230 (which will be further explained below in connection with FIG. 5b) and the information about the last processed data is stored in a way that it can be used also in case of a restart after a shutdown of the replication server 20, preferably by storing the information in a non-volatile storage medium of the replication server 20. If no data was returned (step 225a), possibly because no new redo log data was created since the last data request 40, the replication processing is preferably paused in step 225b for a configurable period of time. Other reasons why no data is returned may be caused by the non-availability of the database server 10 or by other errors reported because the data could not be accessed by the database server 10. Depending on the reason for the error, the replication server 20 may also wait for a defined period of time before returning to step 215. In case of an unrecoverable error, a corresponding error message is generated in step 225c and reported (step 210b), wherein the replication processing is stopped.

FIG. 5b shows the processing of the received redo log data by the replication server 20 (cf. step 230). Generally, a redo log block may comprise one or more individual steps of transactions, each of which is stored in an entry of the redo log block. The processing of a redo log block by a replication server 20 is preferably performed entry by entry until the end of the block (cf. steps 235, 240 and 240a). A specific entry type is used to identify the input data of mass load processing in step 240b), which is used to send a sequence of 'get mass load data' database requests 40 to the database server 10 (cf. steps 245, 250, 255, 255a and 255b), the processing of which has already been described further above. After all blocks of the mass load input file have been processed (step 260), the processing of the redo log block is continued with the next entry in step 235. In case a given entry is not a mass load entry (cf. step 240*b*), the entry is treated as a redo log entry in step 240*c*. After this entry is processed, the position of the last processed data is stored in step 240*d* and the processing returns to step 235.

The invention claimed is:

1. A method for replicating data of a database that is hosted on a database server system by at least one replication server that includes at least one processor, the method comprising:
sending, via the at least one processor, a database request to the database server, wherein the database request comprises metadata indicating replication data requested by the at least one replication server; and
receiving, via the at least one processor, a database response from the database server, wherein the database response comprises the requested replication data indicated by the metadata,
wherein the database request is wrapped in a conventional request to the database hosted on the database server,
wherein the replication data requested by the at least one replication server relates to redo log data stored in a redo log of the database server, the redo log storing modifications made to data stored within the database, and wherein the metadata indicates the redo log data requested by the at least one replication server.

2. A method for replicating data stored in a database of a database server that includes a processing system, the database including a transaction log that stores modifications made to data stored within the database, the method comprising:
receiving, via the processing system, a database request from at least one replication server, wherein the database request comprises metadata indicating replication data requested by the at least one replication server; and
sending, via the processing system, a database response to the at least one replication server, wherein the database response comprises the requested replication data indicated by the metadata,
wherein the database request is wrapped as a conventional request to the database,
wherein the replication data requested by the at least one replication server relates to transaction log data in the transaction log of the database, and wherein the metadata of the database request indicates data of the transaction log that is requested by the at least one replication server.

3. The method of claim 1, wherein the database response comprises additional metadata provided by the database server and wherein the method comprises the further step of:
using the additional metadata by the at least one replication server to indicate requested replication data in at least one subsequent database request.

4. The method of claim 1, wherein the metadata comprises a block number and/or a position indicating the redo log data requested by the at least one replication server.

5. The method of claim 4, wherein the additional metadata comprises a size of the redo log data returned by the database server and wherein the method further comprises:
calculating, by the at least one replication server, the block number and/or the position of redo log data requested in at least one subsequent database request based on the size of the returned redo log data.

6. The method of claim 4, further comprising reading, by the database server, the requested redo log data from at least one redo log output buffer stored in a memory of the database server, or if the requested redo log data is not available in the at least one redo log output buffer, reading the requested redo log data from the redo log of the database server.

7. The method of claim 1, further comprising:
receiving an authorization request from the at least one replication server at the database server;
validating the authorization request by the database server and, depending on the result of the validation, creating a client entry in the database server identifying the at least one replication server.

8. The method of claim 1, wherein the database request sent by the at least one replication server is processed by the database server based on a predefined scheduling priority.

9. The method of claim 1, wherein the replication data requested by the at least one replication server relates to at least one mass load input file of the database server.

10. The method of claim 1, wherein the database request comprises a replication data buffer generated by the at least one replication server and wherein the database response is generated by the database server by inserting the requested replication data into the replication data buffer of the database request.

11. A database server, comprising:
a non-transitory storage medium configured to store a database that includes a plurality of records, the database being associated with a redo log that tracks transactions made against the database;
an interface configured to receive a database request from at least one replication server, wherein the database request comprises metadata indicating replication data of the redo log that is associated with the data stored within the database; and
a processing system including at least one processor, the processing system configured to:
generate a database response for the at least one replication server, wherein the database response comprises the requested replication data from the redo log of the database which is indicated by the metadata of the database request; and
send the database response to the at least one replication server,
wherein the database request is structured as being wrapped in a conventional request to the database.

12. The database server of claim 11, wherein the processing system is further configured to read redo log data from at least one redo log output buffer stored in a memory of the database server, or if the requested redo log data is not available in the at least one redo log output buffer, read the requested redo log data from the redo log of the database server to generate the database response.

13. A replication apparatus, comprising:
a processing system that includes at least one processor, the processing system configured to:
generate a database request for a database hosted on a database computing system, wherein the database request comprises metadata indicating replication data requested by the at least one replication server; and
send the database request to the database computing system for processing thereon; and
an interface configured to receive a database response from the database computing system that hosts a database, wherein the database response comprises the requested replication data indicated by the metadata,
wherein the database request is wrapped in a conventional request to the database, wherein the database is associated with a transaction log that logs modifications that have been performed to the stored data of the database between a first database state and a second database state, wherein the database response includes data from the transaction log.

14. The replication apparatus of claim 13, wherein the database response comprises additional metadata and wherein the processing system is further configured to use the additional metadata to indicate requested replication data in at least one subsequent database request.

15. A system comprising:
the database server according to claim 11; and
the at least one replication server comprising:
a processing system configured to generate the database request for the database server; and
an interface configured to receive the database response from the database server.

16. The replication apparatus of claim 13, wherein the database includes:
stored data that is accessible by conventional requests to the database.

17. The replication apparatus of claim 16, wherein the data from the transaction log that is included in the database response is a partial subset of data in the transaction log.

18. A non-transitory computer readable storage medium storing computer readable instructions for use with a database replication apparatus that includes at least one processor, the stored instructions comprising instructions configured to at least:

construct a replication data request that includes at least one parameter for identifying information that is managed by a database hosted on a database computing system, the database including a plurality of data segments that are retrievable via conventional database requests;

send the replication data request to the database computing system to retrieve information from the database based at least in part on the at least one parameter of the replication data request; and receive responsive replication data, from the database computing system, that is in accordance with the sent replication data request and the at least one parameter, wherein the database is a transactional database that is associated with a transaction log that keeps track of all transactions that update the database, wherein the responsive replication data includes data based on the transaction log, wherein the replication data request is wrapped in a convention database request of a type of the conventional database requests.

\* \* \* \* \*